(12) United States Patent
Grogan et al.

(10) Patent No.: US 6,936,649 B1
(45) Date of Patent: Aug. 30, 2005

(54) STRIPPABLE FILM COATING COMPOSITION FOR SURFACES

(75) Inventors: George W. Grogan, Dallas, TX (US); Robert H. Boyd, Dallas, TX (US)

(73) Assignee: Groco Specialty Coatings Co., Dallas, TX (US)

(*) Notice: Subject to any disclaimer, the term of this patent is extended or adjusted under 35 U.S.C. 154(b) by 134 days.

(21) Appl. No.: 10/385,992

(22) Filed: Mar. 11, 2003

(51) Int. Cl.[7] .................................. C08K 5/54
(52) U.S. Cl. ................ 524/268; 524/297; 524/317; 524/506
(58) Field of Search ................ 524/268, 297, 524/317, 506

(56) References Cited

U.S. PATENT DOCUMENTS

| | | | |
|---|---|---|---|
| 3,037,881 A * | 6/1962 | McDowell | 428/448 |
| 4,064,092 A | 12/1977 | Burroway et al. | |
| 4,632,847 A | 12/1986 | Lomasney et al. | |
| 5,108,836 A * | 4/1992 | Ocampo et al. | 428/335 |
| 5,143,949 A * | 9/1992 | Grogan et al. | 523/334 |
| 5,316,608 A * | 5/1994 | Ocampo et al. | 156/230 |
| 5,604,282 A * | 2/1997 | Grogan et al. | 524/232 |
| 5,639,539 A * | 6/1997 | DeProspero et al. | 428/195.1 |
| 6,448,313 B1 * | 9/2002 | Patel | 524/89 |
| 6,555,615 B2 * | 4/2003 | Van Rheenen | 524/606 |

* cited by examiner

Primary Examiner—Bernard Lipman

(57) ABSTRACT

The present invention provides a strippable film coating mixture that includes a resin component having an acrylic polymer and a polyvinyl polymer, wherein the acrylic polymer comprises from about 20% to about 40% by weight of the mixture and the polyvinyl polymer comprises from about 10% to about 30% by weight of the mixture. The strippable film coating mixture also includes a moisture repellent/release agent comprising from about 0.3% to about 0.6% by weight of the mixture, a surface release agent comprising from about 0.3% to about 2% by weight of the mixture, and a plasticizer comprising from about 1% to about 3% by weight of the mixture with a remainder of the weight of the mixture comprising an aqueous medium ranging from about 45% to about 60% by weight of the mixture.

15 Claims, No Drawings

STRIPPABLE FILM COATING COMPOSITION FOR SURFACES

TECHNICAL FIELD OF THE INVENTION

The present invention relates to a polymer-based protective film coating mixture and more particularly relates to a acrylic polymer/polyvinyl acetate based film coating mixture that is easily strippable from a non-porous surface.

BACKGROUND OF THE INVENTION

The building industry, both commercial and residential, has experienced a strong growth over the last decade, which has resulted in a record number of structures being built. In the course of construction, there are various non-porous surfaces that need to be protected from the construction processes, such as granite, formica, other synthetic counter tops, marble and cultured marble fixtures, and of course, glass windows. Many of these surfaces are often installed early in the construction phase, which leaves them susceptible to becoming damaged or coated with various construction materials, such as paint or dry wall joint compound or brick mortar.

The construction industry attempts to protect these surfaces by covering them with a plastic coating that is typically heat applied. While these coatings are very effective, they can only be applied at the factory, and if they are torn or inadvertently taken off, they cannot be re-applied, which can leave the surface susceptible to the construction environment. Moreover, because the coatings are often heat applied, they can be difficult to completely remove from the object because they often conform to the surfaces shape. For example, when a bathroom fixture is coated, the film may easily strip away from the flat surfaces, but continue to adhere, quite strongly to the irregularly shaped surfaces of the fixture.

Various types of film coating compositions are known in the art and have a wide range of applications. Most of these films are polymer based films. In some instances, the films are sprayed on and then allowed to dry to a coherent protective film, such as the films disclosed in U.S. Pat. No. 5,143,949 to Grogan, et al. and U.S. Pat. No. 5,604,282 to Grogan, et. al., both of which are incorporated herein by reference. However, these coatings often have a significant wax component and re-wetting agent associated with them. Thus, while these films are well suited for many applications, they may be less desirable for construction applications because of the wax residue that can remain once the film is removed and because they can easily re-wet.

Accordingly, what is needed in the art is an easily applied and removable film that does not exhibit the limitations of the prior art.

SUMMARY OF THE INVENTION

To address the above-discussed deficiencies of the prior art, the present invention provides in one embodiment, a strippable film coating mixture. In one embodiment, the present invention provides a resin component including an acrylic polymer and a polyvinyl polymer, wherein said acrylic polymer comprises from about 20% to about 40% by weight of the mixture and the polyvinyl polymer comprises from about 10% to about 30% by weight of the mixture. This embodiment also includes a moisture repellent/release agent comprising from about 0.3% to about 0.6% by weight of the mixture, a surface release agent comprising from about 0.2% to about 1.2% by weight of the strippable film coating mixture, and a plasticizer comprising from about 1% to about 3% by weight of the mixture with a remainder of the weight of the mixture comprising an aqueous medium ranging from about 45% to about 60% by weight of the mixture.

In another embodiment, the present invention provides a strippable dried film coating. In this particular embodiment the dried film coating comprises a resin component including an acrylic polymer and a polyvinyl polymer, wherein the acrylic polymer comprises from about 40% to about 75% by weight of the dried film and the said polyvinyl polymer comprises from about 20% to about 50% by weight of dried film, a moisture repellent/release agent comprising from about 0.6% to about 1.2% by weight of the dried film, a surface release agent comprising from about 0.3% to about 2.4% by weight of the dried film, and a plasticizer comprising from about 3% to about 5% by weight of the dried film.

In another embodiment, the present invention provides a method of making a strippable film coating mixture. The method, in this embodiment, includes mixing an acrylic polymer, a polyvinyl polymer, a moisture repellent/release agent, a surface release agent, a plasticizer, a defoamer, and a wetting agent to form a first mixture, and adding a thickener and an aqueous medium to the first mixture to form a second mixture wherein the acrylic polymer comprises from about 20% to about 40% by weight of the second mixture and the polyvinyl polymer comprises from about 10% to about 30% by weight of said second mixture. The repellent/release agent comprises from about 0.3% to about 0.6% by weight of the second mixture, the surface release agent comprises from about 0.3% to about 2% by weight of the second mixture, and the plasticiser comprises from about 1% to about 3% by weight of the second mixture. The defoamer comprises from 0.1% by weight of the mixture, the wetting agent comprises from about 0.3% to about 0.5% by weight of the second mixture, and the thickener comprises from about 0.1% to about 0.4% by weight of the second mixture with a remainder of the weight of the second mixture comprising the aqueous medium ranging from about 45% to about 60% by weight of the second mixture.

The foregoing has outlined preferred features of the present invention so that those of ordinary skill in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the scope of the invention.

DETAILED DESCRIPTION

The strippable coating mixture of the present invention is a unique combination of components in a polar aqueous medium that provide a solution that easily can be applied to a substrate by spraying, rolling or brushing. Once applied to the substrate, the solution dries to form a removable, protective film that protects the substrate from physical damage during manufacturing, transportation or building construction. When desired, the film can be easily removed from the substrate by physically stripping the film from the substrate or removing with high pressure water.

In one embodiment of the present invention, the strippable film coating mixture generally comprises a resin component that includes an acrylic polymer and a polyvinyl polymer, which together constitute a substantial portion of the solids in weight percent of the strippable film coating mixture. The strippable film coating mixture further includes a moisture repellent/release agent, a surface release agent, and a plasticizer in a polar aqueous medium, such as water. In a preferred embodiment, the strippable coating film mixture and the resulting dried film are substantially free of polyvinyl alcohol; that is the mixture and dried film contains less than about 0.1% by weight of a polyvinyl alcohol.

It should be noted that in some instances, the various components are water-based emulsions or solutions, and unless otherwise stated, it should be understood that the percentages for the various components discussed in this application are directed to the solids content of that particular component only in relation to the total weight of the coating mixture and are not directed to the percent weight of the emulsion or solution that contains the component. Additionally, it should be noted that the acrylic polymers discussed herein are well known and commercially available from a number of suppliers.

The acrylic polymer component of the resin may be unmixed (i.e., substantially chemically pure), or it may be mixed with other constituents and is preferably an acrylic polymer derived from a butyl acrylate, methyl methacrylate, and methacrylic acid that forms an emulsion in water. For example, in one preferred embodiment, the acrylic polymer is derived from a methacrylic acid and is an aqueous mixture that also includes water, ammonia, methacrylic acid and a trace amount of toluene. In such embodiments, the water comprises about 49.9%, ammonia comprises about 0.1159%, the methacrylic acid comprises about 0.0032%, the toluene comprises about 0.0001% with the remainder weight percent of the acrylic polymer mixture being the acrylic polymer. Additionally, in such embodiments, the acrylic polymer mixture is a milky white, opalescent solution with an ammonia odor that is dispersible in water and has a boiling range from about 55° F. to about 214° F., a specific gravity of about 1.056 and a vapor density of about 0.568. The acrylic polymer aqueous mixture that includes the above listed components comprises from about 52% to about 73% by weight of the strippable film coating mixture and is commercially available from a number of commercial suppliers.

Whether mixed or unmixed with other constituents, however, the acrylic polymer solids comprises from about 20% to about 40% by weight of the strippable film coating mixture and more preferably comprises from about 26% to about 36% by weight of the strippable film coating mixture. It should be understood that the phrase "acrylic polymer" as used below with respect to the examples encompasses the same acrylic polymer just discussed and has the same order of preferability, unless otherwise stated.

The other component of the resin is a polyvinyl polymer that preferably forms an emulsion in water. The polyvinyl polymers that fall within the above general description typically are any of a series of polymers derived by polymerization or copolymerization of vinyl monomers ($CH_2$=CH—), including, for example, polyvinyl acetate, polyvinyl ether, such as polyvinyl isobutyl ether and polyvinyl methyl ether, polyalkyl acrylate, polyvinyl acetal, polyvinyl formal, polyvinyl butyrate, polyvinyl chloride, polyvinyl chloride-vinyl acetate copolymers, polyvinylidene copolymers and polyvinylidene chloride-vinyl chloride copolymers. The preferred polymers useful for purposes of the present invention may be produced by emulsion polymerization processes using known catalysts and chain transfer agents, as will be familiar to those skilled in the art.

The polyvinyl polymer solids, which is used in the mixture of the present invention, comprises from about 10% to about 30% by weight of the strippable film coating mixture. In one embodiment, the polyvinyl polymer solids comprise from about 20% to about 27% by weight of the strippable film coating mixture. However, in another embodiment, the polyvinyl polymer solids comprise from about 10% to about 14% by weight of the strippable film coating mixture. Similar to the acrylic polymer, the polyvinyl polymer may be unmixed or mixed with other constituents. For example, the polyvinyl polymer may be a polyvinyl polymer aqueous mixture that is mixed with water and a vinyl acetate monomer. In the polyvinyl polymer aqueous mixture, the polyvinyl acetate polymer comprises from about 50% to about 65% by weight of the polyvinyl polymer aqueous mixture, water comprises from about 40% to about 60% by weight, and the vinyl acetate monomer comprises from about 0% to about 0.5% by weight of the polyvinyl polymer aqueous mixture. In such embodiments, the polyvinyl acetate polymer aqueous mixture comprises from about 20% to about 40% by weight of the strippable film coating mixture.

A preferred polyvinyl acetate emulsion is a white, mobile liquid with a sweet odor, is insoluble in water and has a pH ranging from about 4 to about 9.5 with a vapor pressure of 18.5 mm Hg and a vapor density equal to the vapor density of water. The boiling point is 100° C. (212° F.), the freezing point is the same as water, 0° C. (32° F.) and the specific gravity (water=1) is 1.1. As with the acrylic polymer, the polyvinyl acetate emulsion is well known and is commercially available from a number of suppliers.

It should be understood that the phrase "polyvinyl polymers" as used below with respect to the examples encompasses the same polyvinyl polymers just discussed and have the same order of preferability, unless otherwise stated. However, as later disclosed, the percentages will vary from those stated above. However, it should be noted that the percentage weight combinations of the acrylic polymer and the polyvinyl polymer as discussed above provide the preferred range of tensile strength that is necessary for coating applications related to protecting various surfaces from construction processes and thereby provides advantages over prior art films. In the dried film embodiment, the weight percent of the resin, which includes the acrylic polymer and the polyvinyl polymer is shown in TABLE I, below.

A moisture repellent/release agent is also present in an embodiment of the present invention. In a preferred embodiment, the moisture repellent/release agent solids comprise from about 0.3% to about 0.6% by weight of the strippable film coating mixture and more preferably comprises from about 0.34% to about 0.58% by weight. The moisture repellent/release agent provides the necessary degree of repellent for the film such that the film does not re-wet as does prior art films. Additionally, it gives the film the appropriate amount of release without excessive wax build-up often found in prior art films. The reduced wax build-up is particularly desirable in construction applications because additional cleaning of surfaces, such as windows or counter tops, to remove the excessive wax is not necessary. In a preferred embodiment, the moisture repellent/release agent is one component in a repellent/release agent mixture of water, ammonium hydroxide, a fatty ester and a fatty acid, and in a more specific embodiment, water comprises about 72% by weight and the ammonium hydroxide comprises about 0.9% by weight of the moisture repellent/release agent mixture with the fatty ester and the fatty acid comprising the balance of the moisture repellent/release agent mixture. The repellent/release agent mixture comprises from about 1.2% to about 2% by weight of the strippable film coating mixture.

In another embodiment, the moisture repellent/release agent is a mixture of the above discussed aqueous solution and a second aqueous solution that comprises about 13% by weight water, 9% by weight trace volatile components, such as n-octanol, with the remainder weight percent of the second aqueous solution being phosphate ester. In such embodiments, the first aqueous solution comprises about 1.2% by weight of the strippable film coating mixture and the second aqueous solution comprises about 0.16% by weight of the strippable film coating mixture. In the dried film embodiment, the weight percent of the moisture repellent/release agent is shown in TABLE I, below.

A surface release agent is also present in an embodiment of the present invention. A preferred surface release agent is a silicon polymer, and in a more specific embodiment, the silicon polymer is polydimethylsiloxane. In one embodiment, the surface release agent solids comprise from about 0.2% to about 1.2% by weight of the strippable film coating mixture. The surface release agent helps reduce the tackiness of the exposed surface, which in turn, reduces the build-up of debris that can stick to the outer surface of the film. The release agent also causes water slip and releases the collection of water on the surface. The appearance of the release agent is a white, milky emulsion that has a viscosity of 240 cps. at 25° C. and a specific gravity of 25° C. The silicon content is about 60%, is nonionic and has a pH of about 7.3. The release agent is preferably an aqueous solution in which water comprises about 40% of the surface release agent with the properties described above, and in such embodiments, the release agent aqueous solution comprises from about 0.3% to about 2% by weight of the strippable film coating mixture. In the dried film embodiment, the weight percent of the release agent is shown in TABLE I, below.

An embodiment of the present invention also includes a plasticizer. The plasticizers may be one or a combination of known plasticizers used in conjunction with synthetic polymers, such as phthalate, adipate, and sebacate esters, polyols, such as ethylene glycol and its derivative, tricresyl phosphate, benzoate esters and phosphate esters, to name just a few.

The preferred plasticizer is an ester alcohol that has a molecular weight in the range of about 216 and a general molecular formula of $C_{12}H_{24}O_3$. The preferred ester alcohol is 2,2,4-trimethyl- 1,3-pentanediol monoisobutynate, referenced in the Examples below as "Plasticizer."

Preferably, the plasticizer is either benzoate ester or ethylene glycol or a mixture thereof. It should be understood that the phrase "plasticizer", as used with respect to the other embodiments below, encompass the same plasticizer just discussed and have the same order of preferability, unless otherwise stated. However, as later disclosed, the percentages will vary depending on the embodiment. The plasticizer preferably comprises from about 1% to about 3% by weight of the strippable coating film mixture, and in a more specific embodiment, it comprises from about 1.56% to about 2.51% by weight of the strippable coating film. In the dried film embodiment, the weight percent of the plasticiser is shown in TABLE I, below.

An embodiment of the present invention may also include a wetting agent, which helps wet out the emulsions. One such wetting agent may be tri-butoxyethyl phosphate. In a preferred embodiment, the wetting agent comprises from about 0.3% to about 0.5% by weight of the strippable film coating mixture. In the dried film embodiment, the weight percent of the wetting agent is shown in TABLE I, below.

An embodiment of the strippable coating film mixture may also include a thickener. Such thickeners are used to control application properties of the resin component. Various thickeners include protein thickeners, such as hydroxyethylcellulose, hydrophilic polyacrylates, polyacrylic acid, polysaccharides, fumed silicas, and expanded clays. When used, the thickener preferably comprises from about 0.1% to about 0.4% by weight of the strippable coating mixture, and more preferably ranges from about 0.17% to about 0.33% by weight of the strippable coating film mixture. In the dried film embodiment, the weight percent of the thickener is shown in TABLE I, below.

The preferred thickeners comprise the hydrophilic polyacrylates or the hydroxyethylcellulose in an aqueous solution, such as water, and when present, the thickener aqueous solution comprises from about 1% to about 2% by weight of the strippable coating mixutre. In a preferred embodiment, the hydrophilic polyacrylate is sodium polyacrylate, which is soluble in water. The polyacrylate comprises from about 17% to about 30% by weight of the thickener aqueous solution and water comprises about 70% to about 83% by weight of the thickener aqueous solution. This solution is referenced in the Examples below as "Thickener" and comprises from about 1% to about 2% of the strippable coating film mixture.

It should be understood that the phrase "thickeners", as used with respect to the other embodiments below, encompass the same thickeners just discussed and have the same order of preferability, unless otherwise stated. However, as later disclosed, the percentages will vary depending on the embodiment.

The remainder of the weight of the coating mixture comprises a polar aqueous medium, preferably water, wherein the percent weight of the aqueous medium ranges from about 45% to about 60% by weight of the strippable film coating mixture.

The embodiments discussed above relate to embodiments of the strippable coating film mixture, where water comprises a large portion of the weight percent of the mixture. It should be understood, however, that the present invention also includes embodiments where the film is dried and contains a trace amount of water. Table I as set forth below details the weight percent with respect to these general embodiments.

TABLE I

| COMPONENTS | MIXTURE WT. % | DRIED FILM WT. % |
|---|---|---|
| Resins | 45%–52% | 90%–98% |
| Defoamer (when present) | 0.1% | 0.1%–0.2% |
| Moisture Repellent/Release | 0.3%–0.6% | 0.6%–1.2% |
| Surface Release Agent | 0.3%–2.0% | 0.3%–2.4% |
| Plasticizer | 1.0%–3% | 3.0%–5% |
| Wetting Agent (when present) | 0.3%–0.5% | 0.6%–1.0% |
| Thickener (when present) | 0.1%–0.4% | 0.3%–0.7% |
| U.V. Agent (when present) | 0.2%–0.3% | 0.35%–0.45% |
| Aqueous Medium | 40%–60% | 0.0%–5.0% |

The ranges reflected above are further illustrated in the following examples. It should be noted that all of the mixtures covered by the following examples produced a strippable film coating that could be peeled off the substrate to which the strippable coating film mixture was applied. It should also be noted that the various components used herein are commercially available and the mixtures and resulting dried films were substantially free of polyvinyl alcohol as defined above.

EXAMPLE I

The strippable coating mixture was prepared by placing the following components in a mixing container in the following order and in the amount indicated:

500 pounds (lbs.) of acrylic polymer aqueous mixture wherein the acrylic polymer comprised about 50% by weight of the mixture, water comprised about 49.9% by weight of the mixture, ammonia comprised about 0.1159% by weight of the mixture, methacrylic acid comprised about 0.0032% by weight of the mixture and toluene comprised about 0.0001% by weight of the mixture;

400 lbs. of polyvinyl acetate aqueous mixture wherein a vinyl acetate polymer comprised from about 50% to about 65% by weight of the mixture, water comprised from about 40% to about 60% by weight of the mixture and vinyl acetate monomer comprised from about 0% to about 0.5% by weight of the mixture;

2.0 lbs. of a defoamer aqueous mixture wherein a hydrotreated heavy paraffinic petroleum distillate comprised about 42% by weight of the mixture, ethoxylated alkylphenol comprised about 5% of by weight of the mixture and water comprised about 48% by weight of the mixture;

2.0 lbs. of an ultra violet protection agent comprising 100% by weight of a-3-(3-2H-benzotriazol-2-yl)-5-t-butyl-4-hydroxyphenyl)propionyl-j-hydroxypoly(oxyethylene) and a-3-(3-2H-benzotriazol-2-yl)-5-t-butyl-4-hydroxyphenyl)propionyl-j-3-(2H-benzotriaxol-2-yl)-5-t-butyl-4-hydroxypheyl)propionyloxypoly(oxyethylene).

20.0 lbs. of a moisture repellent/release agent aqueous mixture wherein about water comprised about 72% by weight of the mixture, ammonium hydroxide comprised about 0.9% by weight of the mixture with the balance of the percent weight of the mixture comprising a fatty acid and a polywax having 20 to 45 carbons;

3.0 lbs. of a surface release agent comprising a polydimethylsiloxane emulsion;

17.0 lbs. of a plasticizer of ester alcohol, 2,2,4-trimethyl-1,3-pentanediol monoisobutyrate, having a molecular formula of $C_{12}H_{24}O_3$ and a molecular weight of 216.32;

3.50 lbs. of a wetting agent comprised 100% by weight of tri-butoxyethyl phosphate.

The above components were mixed at a temperature range from about 65° F. to about 95° F. until a smooth mixture was obtained. Then, 9.50 lbs. of an aqueous mixture of thickener wherein water comprised about 83% by weight of water and about 17% by weight of polyacrlyate and 10 lbs. of water were mixed with the smooth mixture at the same range of temperatures as noted above until a final smooth mixture was obtained.

The final mixture was substantially free of polyvinyl alcohol and was applied to a glass surface and allowed to dry to a film. The dry film was then easily stripped off the glass surface without leaving a waxy residue that required further cleaning. It was also noted that the dried film protected window rubbers seals from the corrosive effects of muriatic acid.

EXAMPLE II 700 pounds (lbs.) of acrylic polymer aqueous mixture wherein the acrylic polymer comprised about 50% by weight of the mixture, water comprised about 49.9% by weight of the mixture, ammonia comprised about 0.1159% by weight of the mixture, methacrylic acid comprised about 0.0032% by weight of the mixture and toluene comprised about 0.0001% by weight of the mixture;

200 lbs. of polyvinyl acetate aqueous mixture wherein a vinyl acetate polymer comprised from about 50% to about 65% by weight of the mixture, water comprised from about 40% to about 60% by weight of the mixture and vinyl acetate monomer comprised from about 0% to about 0.5% by weight of the mixture;

2.08 lbs. of a defoamer aqueous mixture wherein a hydrotreated heavy paraffinic petroleum distillate comprised about 42% by weight of the mixture, ethoxylated alkylphenol comprised about 5% of by weight of the mixture and water comprised about 48% by weight of the mixture;

2.0 lbs. of an ultra violet protection agent comprising 100% by weight of a-3-(3-2H-benzotriazol-2-yl)-5-t-butyl-4-hydroxyphenyl)propionyl-j-hydroxypoly(oxyethylene) and a-3-(3-2H-benzotriazol-2-yl)-5-t-butyl-4-hydroxyphenyl)propionyl-j-3-(2H-benzotriaxol-2-yl)5-t-butyl-4-hydroxypheyl)propionyloxypoly(oxyethylene).

12.0 lbs. of a moisture repellent/release agent aqueous mixture wherein water comprised about 72% by weight of the mixture, ammonium hydroxide comprised about 0.9% by weight of the mixture with the balance of the percent weight of the mixture comprising a fatty acid and a polywax having 20 to 45 carbons;

5.0 lbs. of a surface release agent comprising a polydimethylsiloxane emulsion;

15.0 lbs. of a plasticizer of ester alcohol, 2,2,4-trimethyl-1,3-pentanediol monoisobutyrate, having a molecular formula of $C_{12}H_{24}O_3$ and a molecular weight of 216.32;

3.50 lbs. of a wetting agent comprised 100% by weight of tri-butoxyethyl phosphate.

The above components were mixed at a temperature range from about 65° F. to about 95° F. until a smooth mixture was obtained. Then, 12.50 lbs. of an aqueous mixture of thickener wherein water comprised about 83% by weight of water and about 17% by weight of polyacrlyate and 10 lbs. of water were mixed with the smooth mixture at the same range of temperatures as noted above until a final smooth mixture was obtained.

The final mixture was substantially free of polyvinyl alcohol and was applied to a glass surface and allowed to dry to a film. The dry film was then easily stripped off the glass surface without leaving a waxy residue that required further cleaning. It was also noted that the dried film protected window rubbers seals from the corrosive effects of muriatic acid.

EXAMPLE III 700 pounds (lbs.) of acrylic polymer aqueous mixture wherein acrylic polymer comprised about 50% by weight of the mixture, water comprised about 49.9% by weight of the mixture, ammonia comprised about 0.1159% by weight of the mixture, methacrylic acid comprised about 0.0032% by weight of the mixture and toluene comprised about 0.0001% by weight of the mixture;

200 lbs. of polyvinyl acetate aqueous mixture wherein a vinyl acetate polymer comprised from about 50% to about 65% by weight of the mixture, water comprised from about 40% to about 60% by weight of the mixture and vinyl acetate monomer comprised from about 0% to about 0.5% by weight of the mixture;

2.08 lbs. of a defoamer aqueous mixture wherein a hydrotreated heavy paraffinic petroleum distillate comprised about 42% by weight of the mixture, ethoxylated alkylphenol comprised about 5% of by weight of the mixture and water comprised about 48% by weight of the mixture;

2.0 lbs. of an ultra violet protection agent comprising 100% by weight of a-3-(3-2H-benzotriazol-2-yl)-5-t-butyl-4-hydroxyphenyl)propionyl-j-hydroxypoly(oxyethylene) and a-3-(3-2H-benzotriazol- 2-yl)-5-t-butyl-4-hydroxyphenyl)propionyl-j-3-(2H-benzotriaxol-2-yl)-5-t-butyl-4-hydroxypheyl)propionyloxypoly(oxyethylene).

12.0 lbs. of a moisture repellent/release agent aqueous mixture wherein water comprised about 72% by weight of the mixture, ammonium hydroxide comprised about 0.9% by weight of the mixture with the balance of the percent weight of the mixture comprising a fatty acid and a polywax having 20 to 45 carbons;

3.0 lbs. of a surface release agent comprising a polydimethylsiloxane emulsion;

25.0 lbs. of a plasticizer of ester alcohol, 2,2,4-trimethyl-1,3-pentanediol monoisobutyrate, having a molecular formula of $C_{12}H_{24}O_3$ and a molecular weight of 216.32;

5.0 lbs. of a wetting agent comprised 100% by weight of tri-butoxyethyl phosphate.

The above components were mixed at a temperature range from about 65° F. to about 95° F. until a smooth mixture was obtained. Then, 19.50 lbs. of an aqueous mixture of thickener wherein water comprised about 83% by weight of water and about 17% by weight of polyacrlyate, 27.5 lbs. of water and 1.6 lbs. of a second moisture repellent/release agent as discussed above were mixed with the smooth mixture at the same range of temperatures as noted above until a final smooth mixture was obtained.

The final mixture was substantially free of polyvinyl alcohol and was applied to a glass surface and allowed to dry to a film. The dry film was then easily stripped off the glass surface without leaving a waxy residue that required further cleaning. It was also noted that the dried film protected window rubbers seals from the corrosive effects of muriatic acid.

EXAMPLE IV 700 pounds (lbs.) of acrylic polymer aqueous mixture wherein the acrylic polymer comprised about 50% by weight of the mixture, water comprised about 49.9% by weight of the mixture, ammonia comprised about 0.1159% by weight of the mixture, methacrylic acid comprised about 0.0032% by weight of the mixture and toluene comprised about 0.0001% by weight of the mixture;

200 lbs. of polyvinyl acetate aqueous mixture wherein a vinyl acetate polymer comprised from about 50% to about 65% by weight of the mixture, water comprised from about 40% to about 60% by weight of the mixture and vinyl acetate monomer comprised from about 0% to about 0.5% by weight of the mixture;

2.08 lbs. of a defoamer aqueous mixture wherein a hydrotreated heavy paraffinic petroleum distillate comprised about 42% by weight of the mixture, ethoxylated alkylphenol comprised about 5% of by weight of the mixture and water comprised about 48% by weight of the mixture;

2.0 lbs. of an ultra violet protection agent comprising 100% by weight of a-3-(3-2H-benzotriazol-2-yl)-5-t-butyl-4-hydroxyphenyl)propionyl-j-hydroxypoly(oxyethylene) and a-3-(3-2H-benzotriazol-2-yl)-5-t-butyl-4-hydroxyphenyl)propionyl-j-3-(2H-benzotriaxol-2-yl)-5-t-butyl-4-hydroxypheyl)propionyloxypoly(oxyethylene).

12.0 lbs. of a moisture repellent/release agent aqueous mixture wherein water comprised about 72% by weight of the mixture, ammonium hydroxide comprised about 0.9% by weight of the mixture with the balance of the percent weight of the mixture comprising a fatty acid and a polywax having 20 to 45 carbons;

20.0 lbs. of a surface release agent comprising a polydimethylsiloxane emulsion;

25.0 lbs. of a plasticizer of ester alcohol, 2,2,4-trimethyl-1,3-pentanediol monoisobutyrate, having a molecular formula of $C_{12}H_{24}O_3$ and a molecular weight of 216.32;

5.0 lbs. of a wetting agent comprised 100% by weight of tri-butoxyethyl phosphate.

The above components were mixed at a temperature range from about 65° F. to about 95° F. until a smooth mixture was obtained. Then, 19.50 lbs. of an aqueous mixture of thickener wherein water comprised about 83% by weight of water and about 17% by weight of polyacrlyate, 27.5 lbs. of water and 1.6 lbs. of a second moisture repellent/release agent discussed above were mixed with the smooth mixture at the same range of temperatures as noted above until a final smooth mixture was obtained.

The final mixture was substantially free of polyvinyl alcohol and was applied to a glass surface and allowed to dry to a film. The dry film was then easily stripped off the glass surface without leaving a waxy residue that required further cleaning. It was also noted that the dried film protected window rubbers seals from the corrosive effects of muriatic acid.

Although the present invention has been described in detail, one of ordinary skill in the art should understand that they can make various changes, substitutions and alterations herein without departing from the scope of the invention.

What is claimed is:

1. A mixture for forming a strippable film coating, comprising:
    a resin component including an acrylic polymer and a polyvinyl polymer, wherein said acrylic polymer comprises from about 20% to about 40% by weight of said mixture and said polyvinyl polymer comprises from about 10% to about 30% by weight of said mixture;
    a moisture repellent/release agent comprising from about 0.3% to about 0.6% by weight of said mixture;
    a surface release agent comprising from about 0.2% to about 2% by weight of said mixture; and
    a plasticizer comprising from about 1% to about 3% by weight of said mixture with a remainder of said weight of said mixture comprising an aqueous medium ranging from about 45% to about 60% by weight of said mixture; wherein said mixture is substantially free of a polyvinyl alcohol.

2. The mixture as recited in claim 1 further including:
    a defoamer comprising from about 0.1% by weight of said mixture;
    a wetting agent comprising from about 0.3% to about 0.5% by weight of said mixture; and
    a thickener comprising from about 0.1% to about 0.4% by weight of said mixture.

3. The mixture as recited in claim 1 further including an ultra violet protection agent comprising from about 0.2% to about 0.3% by weight of said mixture.

4. The mixture as recited in claim 3 wherein said ultra violet protection agent is a mixture of a-3-(3-2H-benzotriazol-2-yl)-5-t-butyl-4-hydroxyphenyl)propionyl-j-hydroxypoly(oxyethylene) and a-3-(3-2H-benzotriazol-2-yl)-5-t-butyl-4-hydroxyphenyl)propionyl-j-3-(2H-benzotriaxol-2-yl)-5-t-butyl-4-hydroxypheyl)propionyloxypoly(oxyethylene).

5. The mixture as recited in claim 1 wherein said acrylic polymer is a first mixture that includes water, acrylic polymer, ammonia, methacrylic acid and toluene.

6. The mixture as recited in claim 5 wherein said water comprises about 49% by weight of said first mixture, said ammonia comprises from about 0.06% to about 0.09% by weight of said first mixture, said methacrylic acid comprises from about 0.001% to about 0.002% by weight of said first mixture and said toluene comprises from about 0.00005% to about 0.00007% by weight of said first mixture.

7. The mixture as recited in claim 5, wherein said polyvinyl polymer is a vinyl acetate polymer mixture.

8. The mixture as recited in claim 7 wherein said vinyl acetate polymer mixture is a second mixture that includes water, vinyl acetate polymer, and vinyl acetate monomer.

9. The mixture as recited in claim 8 wherein said water comprises from about 40% to about 60% by weight of said second mixture and said vinyl acetate polymer comprises from about 50% to about 65% of by weight of said second mixture.

10. The mixture as recited in claim 9 wherein vinyl acetate monomer comprises about 0.50% by weight of said second mixture.

11. The mixture as recited in claim 1 wherein said surface release agent is a silicon polymer.

12. The mixture as recited in claim 11 wherein said silicon polymer is a polydimethylsiloxane.

13. The mixture as recited in claim 1 wherein said moisture repellent/release agent comprises a repellent/release agent mixture of water, ammonium hydroxide, a fatty ester and a fatty acid.

14. The mixture as recited in claim 13 wherein said water comprises about 72% by weight and said ammonium hydroxide comprises about 0.9% by weight of said repellent/release agent mixture with said fatty ester and said fatty acid comprising the balance of said repellent/release agent mixture.

15. The mixture as recited in claim 1 wherein said plasticizer is an ester alcohol.

* * * * *